H. W. HORTON.
WATER BOILING APPARATUS.
No. 50,586.        Patented Oct. 24, 1865.
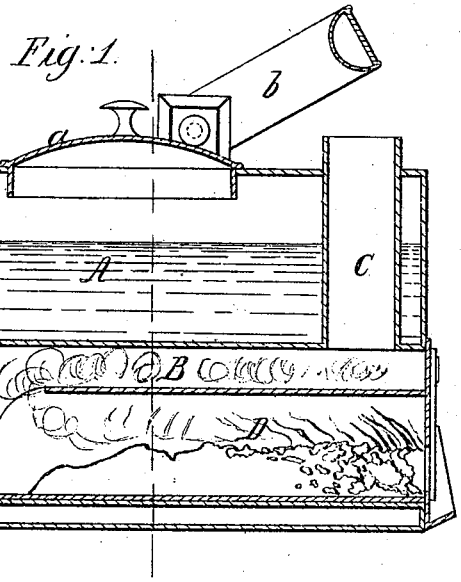
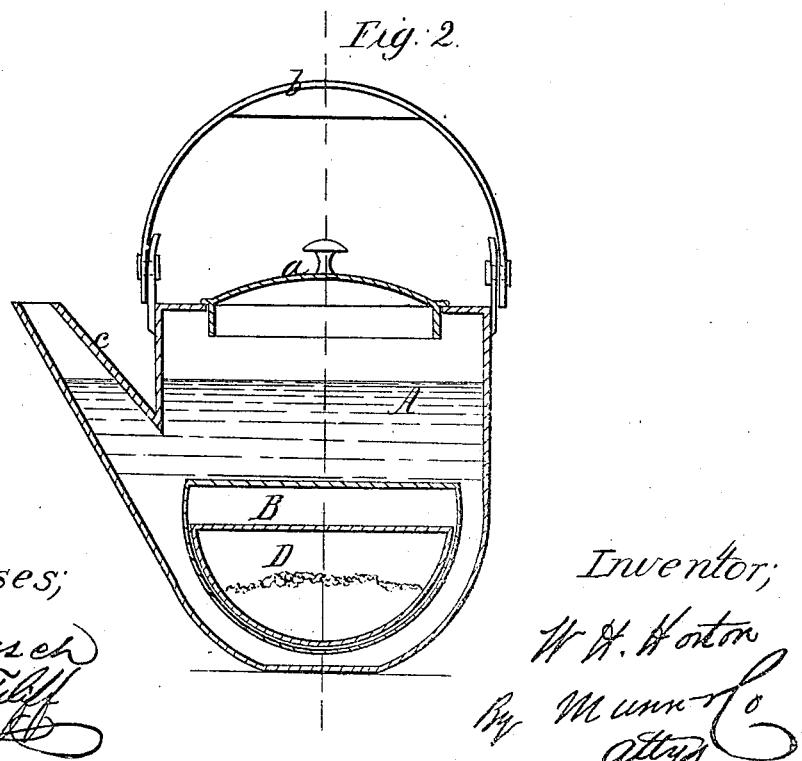

UNITED STATES PATENT OFFICE.

H. W. HORTON, OF HAMBURG, MICHIGAN.

WATER-BOILING APPARATUS.

Specification forming part of Letters Patent No. 50,586, dated October 24, 1865.

*To all whom it may concern:*

Be it known that I, H. W. HORTON, of Hamburg, in the county of Livingston and State of Michigan, have invented a new and Improved Water-Boiling Apparatus; and I do hereby declare that the following is a full, clear, and exact description thereof, which will enable others skilled in the art to make and use the same, reference being had to the accompanying drawings, forming part of this specification, in which—

Figure 1 is a longitudinal vertical section of the apparatus, taken in the line $x$ $x$, Fig. 2. Fig. 2 is a transverse section taken in the line $y$ $y$, Fig. 1.

Similar letters of reference indicate like parts.

The object of my invention is to provide a vessel for boiling water without placing the same upon a stove or fire; and my invention consists in arranging within the lower part of any suitable vessel capable of containing water or other fluid a chamber having a draft-pipe communicating with the exterior of the vessel, and in employing within said chamber a fire box or pan which can be removed at pleasure, and in which a fire may be made for radiating heat, which is caused to pass first through the fire-box, then back through the chamber for its entire length, and finally up through the pipe, as will be hereinafter described.

To enable others to understand my invention, I will proceed to describe it.

A represents the body of the vessel, which may be of any desirable form, and which is provided with a lid, $a$, for closing it, and a handle, $b$, for lifting it, and a spout, $c$, through which to discharge or pour out its contents.

B is the heating-chamber, and it is situated in the lower part of the vessel A, extending nearly its entire length, and its front or door is at one end of the vessel, as shown clearly in Fig. 1. It has a pipe, C, connected to it, which passes up through the vessel A and out at the top thereof.

D is the fire box or pan, made of metal suitable for the purpose. This pan or box is made of a size and shape to fit into the chamber B, and it has a covered top, the escape for the heat, &c., being out of the rear of the said box or pan. The size and depth of the box or pan is such as to leave a space between its top and the top of the chamber B, so that the heated air, &c, after passing out of the rear of the fire-box, will be caused to travel the whole length of the chamber before it is permitted to escape up the pipe. The fire box or pan is provided at its front with a suitable door or draft-regulator and a handle by which to draw it out.

By this arrangement it will be seen that I economize all the heat which can be gained from the fire in the fire-box. The water surrounds the chamber on all the sides, except the front, and even the pipe passes through the water, so that a great quantity of the water is brought in contact with the heating-surface.

The article is useful, and will recommend itself to all persons.

What I claim as new, and desire to secure by Letters Patent, is—

1. The chamber B, when arranged in a boiling apparatus, substantially as and for the purpose specified.

2. The fire box or pan D, in combination with the chamber B and vessel A, substantially as described.

3. The combination of the vessel A, chamber B, pipe C, fire box or pan D, substantially as herein specified.

H. W. HORTON.

Witnesses:
J. M. EAMAN,
GEO. TEEPLE.